(12) United States Patent
Sasaoka et al.

(10) Patent No.: US 6,229,946 B1
(45) Date of Patent: May 8, 2001

(54) DISPERSION-SHIFTED OPTICAL FIBER

(75) Inventors: Eisuke Sasaoka; Takatoshi Kato, both of Yokohama (JP)

(73) Assignee: Sumitomo Chemical Company, Ltd., Osaka (JP)

( * ) Notice: Subject to any disclaimer, the term of this patent is extended or adjusted under 35 U.S.C. 154(b) by 0 days.

(21) Appl. No.: 09/541,912

(22) Filed: Apr. 3, 2000

Related U.S. Application Data

(63) Continuation-in-part of application No. PCT/JP98/04370, filed on Sep. 29, 1998.

(30) Foreign Application Priority Data

Oct. 2, 1997 (JP) .................................................. 9-269910

(51) Int. Cl.$^7$ .................................................. G02B 6/02
(52) U.S. Cl. .................................................. 385/123
(58) Field of Search .................................................. 385/123, 122, 385/124–127, 129, 24, 147, 89, 27, 141; 65/385, 111, 425; 359/115, 174, 341

(56) References Cited

U.S. PATENT DOCUMENTS

| 5,032,001 | * | 7/1991 | Shang | 385/124 |
| 5,448,674 | * | 9/1995 | Vengsarkar et al. | 385/123 |
| 5,732,170 | * | 3/1998 | Okude et al. | 385/27 |
| 5,778,113 | * | 7/1998 | Yu | 385/3 |
| 5,878,182 | * | 3/1999 | Peckhman | 385/123 |
| 5,883,990 | * | 3/1999 | Sasaoka et al. | 385/37 |
| 6,005,997 | * | 12/1999 | Robinson et al. | 385/24 |
| 6,050,109 | * | 4/2000 | Kosinski et al. | 65/385 |

FOREIGN PATENT DOCUMENTS

| 0 724 171 | 7/1996 | (EP) . |
| 51-133041 | 11/1976 | (JP) . |
| 62-297808 | 12/1987 | (JP) . |
| 8-248251 | 9/1996 | (JP) . |
| 9-33744 | 2/1997 | (JP) . |

\* cited by examiner

Primary Examiner—Akm E. Ullah
(74) Attorney, Agent, or Firm—Pillsbury Winthrop LLP

(57) ABSTRACT

The present invention relates to a dispersion-shifted optical fiber comprising a structure for reducing optical loss and restraining nonlinear phenomena from occurring. In order to restrain the nonlinear phenomena from occurring, this dispersion-shifted optical fiber has an effective area of 70 $\mu m^2$ or more with respect to light whose center wavelength falls within the range of 1500 to 1600 nm, and the peak position where optical power of the light in a fundamental mode is maximized is radially shifted from a center of a core region by a predetermined distance. Also, in this dispersion-shifted optical fiber, optical power at a position radially separated from the peak position by a distance which is five times the center wavelength of the light becomes $1/100$ or less of the optical power at the peak position. As a consequence of this structure, bending loss can effectively be reduced.

6 Claims, 6 Drawing Sheets

DISPERSION-SHIFTED OPTICAL FIBER

RELATED APPLICATIONS

This is a Continuation-In-Part application of International Patent application serial No. PCT/JP98/04370 filed on Sep. 29, 1998, now pending.

BACKGROUND OF THE INVENTION

1. Field of the Invention

The present invention relates to a single-mode optical fiber used as a transmission line in optical communications or the like; and, in particular, to a dispersion-shifted optical fiber suitable for wavelength-division multiplexing (WDM) transmission.

2. Related Background Art

Conventionally, in optical communication systems employing single-mode optical fibers as their transmission lines, light in the wavelength band of 1.3 μm or 1.55 μm has often been utilized as signal light for communications. Recently, among others, the use of light in the wavelength band of 1.55 μm has been increasing from the viewpoint of reducing transmission loss in transmission lines. Single-mode optical fibers employed in such transmission lines for light in the wavelength band of 1.55 μm have been designed such that their wavelength dispersion (phenomenon in which pulse waves are broadened due to the fact that the propagation speed of light varies depending on wavelength) with respect to light in the wavelength band of 1.55 μm is nullified (to yield dispersion-shifted optical fibers having a zero-dispersion wavelength of 1550 nm).

Also, as long-haul transmission has become possible with the advent of WDM transmission or optical amplifiers in recent years, in order to reduce nonlinear phenomena (to suppress distortion of signal light), a dispersion-shifted optical fiber of a dual-shape core structure having an effective area $A_{\it{eff}}$ of 70 $\mu m^2$ or more, such as that shown in FIG. 1A, has been proposed (Japanese Patent Application Laid-Open No. 8-248251). Here, nonlinear optical effects refer to phenomena in which signal light pulses are distorted in proportion to density of light intensity or the like due to nonlinear phenomena such as four-wave mixing (FWM), self-phase modulation (SPM), cross-phase modulation (XPM), and the like, thereby restricting transmission speed or repeater spacing in relay transmission systems.

In such a dispersion-shifted optical fiber, as shown in FIG. 1B, the refractive index profile of its core region 10 is designed such that the power distribution PA(r) of propagating light attains its maximum value $PA_{max}$ at the center position $O_x$ (r=0) in the core region 10. Further, at the outer periphery of the center part of the core region 10 having a higher refractive index, a peripheral area having a lower refractive index is provided. The introduction of peripheral area broadens the envelope of optical power distribution PA(r). Since the envelope is broadened, the effective area $A_{\it{eff}}$ becomes 70 $\mu m^2$ or more (so as to prevent the optical power from being concentrated at the center of the core), thereby reducing the above-mentioned nonlinear phenomena.

In the conventional dispersion-shifted optical fiber shown in FIG. 1A, the center part of the core region 10 with a higher refractive index has an outside diameter of 4.1 μm, and a relative refractive index difference of 0.94% with respect to its cladding region 20. The peripheral area of the core region 10 with a low refractive index has an outside diameter of 31.5 μm, and a relative refractive index differ-ence of 0.20% with respect to the cladding region 20. When the refractive index profile of the core region 10 is thus designed, its effective area $A_{\it{eff}}$ becomes 70 $\mu m^2$ or more.

SUMMARY OF THE INVENTION

Having studied the conventional dispersion-shifted optical fiber, however, the inventors have found the following problems. Namely, as shown in FIG. 1B, the power distribution PA(r) of light propagating in the conventional dispersion-shifted optical fiber has such a form as the normalized power attains its maximum $PA_{max}$ at the center of the core region and decreases toward the outer periphery. Hence, when a dispersion-shifted optical fiber yielding such an optical power distribution employs a refractive index profile which can attain a greater effective area, the enveloe of the optical power distribution become wider, thereby weakening its function of confining light therein. As a result, the optical loss caused by macrobending or microbending (hereinafter simply referred to as bending loss) would increase, thereby making it difficult to transmit light over a long distance without attenuation.

In view of such problems of the prior art, it is an object of the present invention to provide a dispersion-shifted optical fiber comprising a structure which reduces optical loss, such as bending loss in particular, and restrains non-linear phenomena from occurring.

In order to effectively restrain the above-mentioned non-linear phenomena from occurring, the dispersion-shifted optical fiber according to the present invention has a core region extending along a predetermined axis, and a cladding region provided on the outer periphery of the core region and having such a refractive index profile that can yield an effective area of 70 $\mu m^2$ or more for one or more light signals whose center wavelengths fall within the range of about 1500 to 1600 nm. In particular, in order to obtain an effective area $A_{\it{eff}}$ of 70 $\mu m^2$ or more, the refractive index profile of the dispersion-shifted optical fiber according to the present invention is designed such that a peak position where the optical power of the light signals in thier fundamental mode is maximized is radially separated from the center of the core region by a predetermined distance.

Here, as disclosed in Japanese Patent Application Laid-Open No. 8-248251, the above-mentioned effective area $A_{\it{eff}}$ is given by the following expression (1):

$$A_{\it{eff}} = 2\pi (\int_0^\infty E^2 r\,dr)^2 / (\int_0^\infty E^4 r\,dr) \tag{1}$$

where E is the electric field accompanying the propagating light, and r is the radial distance from the center of the core region.

On the other hand, the refractive index profile is represented by the relative refractive index difference $\Delta n_i$ given by the following expression (2):

$$\Delta n_i = (n_i - n_{cd})/n_{cd} \tag{2}$$

where $n_{cd}$ is the average refractive index of the reference area ($SiO_2$) in the cladding region, and $n_i$ is the average refractive index in each part i constituting the core region. Thus, the relative refractive index difference $\Delta n_i$ is expressed with reference to the average refractive index $n_{cd}$ of the reference area in the cladding region. In this specification, relative refractive index difference is expressed in terms of percentage, and an area having a negative relative refractive index difference indicates an area having a refractive index lower than that of the reference area.

When effective area is increased alone in order to restrain nonlinear phenomena from occurring, the envelope of optical power distribution would also be broadened, thereby making it difficult to reduce bending loss. Hence, the refractive index profile of the dispersion-shifted optical fiber according to the present invention is designed such that optical power remarkably decreases at a position separated, by a distance which is five times the center wavelength of the signal light, from the peak position where the optical power of the light signals is maximized.

The optical power distribution broadens as the wavelength of propagating light shifts to the longer wavelength side. Hence, using the signal light wavelength as a parameter, the optical power at a position radially separated from the peak position by a distance which is five times the signal wavelength is employed as a reference for evaluating bending loss. As a result of measurements, the inventors have confirmed that, in the case where the optical power at the evaluation reference position (position radially separated from the peak position by a distance which is five times the signal wavelength) is not greater than $1/100$ of the optical power at the peak position (maximum value), bending loss can remarkably be reduced (to about $1/20$) as compared with the conventional dispersion-shifted optical fiber.

In order to suppress a microbending loss caused by cable-fabrication to a sufficient level in practice, it is necessary that the microbending loss is substantially suppressed to 1 dB/km or less. On the other hand, as can be seen from FIG. 2, in order to suppress the microbending loss to 1 dB/km or less, it is necessary that the ratio $(P/P_{max})$ of an optical power P at the evaluation reference position with respect to a maximum optical power $P_{max}$ becomes $1/100$ or less.

Thus, when the effective area $A_{eff}$ is set to 70 $\mu m^2$ or more, nonlinear phenomena are reduced, thereby the distortion of signal light is restrained from occurring. Further, since the refractive index profile is designed such that the peak position where the optical power in the fundamental mode is maximized is shifted from the center of the core region and that the optical power at the evaluation reference position radially separated from the peak position by a distance which is five times the signal wavelength becomes $1/100$ or less of the maximum optical power at the peak position, the effective area $A_{eff}$ can sufficiently be increased without broadening the envelope of optical power distribution. Consequently, light is well confined, thereby the bending loss caused by macrobending and microbending would decrease.

Here, in order to realize the above-mentioned refractive index profile, the dispersion-shifted optical fiber according to the present invention may employ either a ring-shaped core structure or a multilayer structure. In ring-shaped structure the core region comprises a first core having a predetermined refractive index and a second core which, provided on the outer periphery of the first core, has a refractive index higher than that of the first core. In the multilayer core structure the core region comprises a first core having a predetermined refractive index; a second core provided on the outer periphery of the first core and having a refractive index higher than that of the first core; a third core provided on the outer periphery of the second core and having a refractive index lower than that of the second core; and a fourth core provided on the outer periphery of the third core and having a refractive index higher than that of the third core. On the other hand, the cladding region may have either a single layer or a depressed cladding structure comprising a first cladding provided on the outer periphery of the core region and having a refractive index lower than that of the outermost layer of the core region and a second cladding provided on the outer periphery of the first cladding and having a refractive index higher than that of the first cladding. Further employable as the refractive index profile of the dispersion-shifted optical fiber according to the present invention are refractive index profiles in which a depressed cladding structure and a ring-shaped core structure or a multilayer core structure are combined together.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 1A is a refractive index profile of a conventional dispersion-shifted optical fiber, whereas

DESCRIPTION OF THE PREFERRED EMBODIMENTS

In the following, dispersion-shifted optical fibers according to the present invention will be explained with reference to FIGS. 2, 3A to 3C, 4, and 5A to 6C. Among the drawings, constituents identical or equivalent to each other will be referred to with numerals or letters identical to each other. In each of the optical power distributions P(r) shown in FIGS. 3C, 5C, and 6C, the optical power in the ordinate is normalized with reference to the maximum value $P_{max}$; whereas the relative refractive index difference is expressed in terms of percentage in each of the refractive index profiles shown in FIGS. 3B, 5B, and 6B.

First Embodiment

Figure 3A:
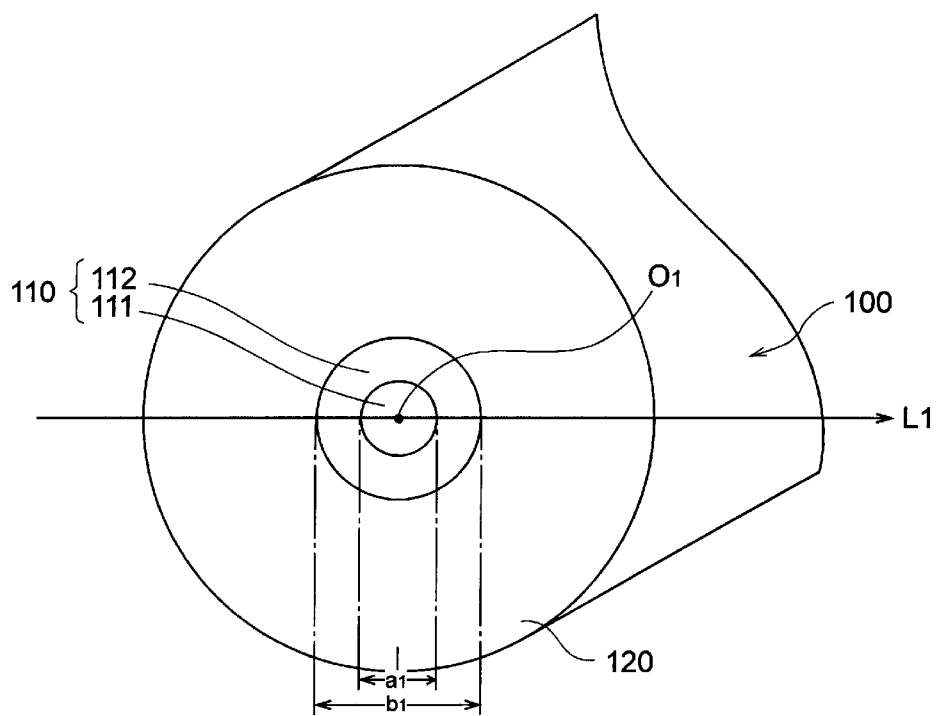
FIG. 3A is a view showing a cross-sectional structure of a first embodiment of dispersion-shifted optical fiber according to the present invention.

FIG. 3A is a view showing a cross-sectional structure of the first embodiment of dispersion-shifted optical fiber according to the present invention.

The dispersion-shifted optical fiber according to the first embodiment is a single-mode optical fiber which guides signal light in a 1.55-μm wavelength band whose center wavelength λ falls within the range of about 1500 to 1600 nm. Also, as shown in FIG. 3A, this dispersion-shifted optical fiber 100 comprises a core region 110 and a cladding region 120 provided on the outer periphery of the core region 110.

The core region 110 is constituted by a first core 111 and a second core 112 provided on the outer periphery of the first core 111 (thus forming a ring-shaped core structure). The first core 111 has an outside diameter a1 of 4.3 μm, whereas the second core 112 has an outside diameter b1 of 7.1 μm.

Figure 3B:
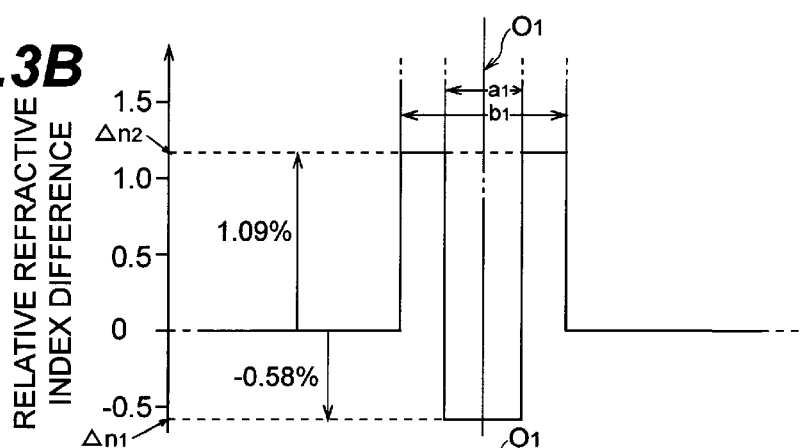
FIG. 3B is a refractive index profile of the dispersion-shifted optical fiber of the first embodiment shown in FIG. 3A.

FIG. 3B is a refractive index profile of the dispersion-shifted optical fiber 100 of the first embodiment shown in FIG. 3A, which is represented by the relative refractive index difference of each part along the line L1 passing through the center $O_1$ of the dispersion-shifted optical fiber 100. Here, the relative refractive index difference is given by the above-mentioned expression (2), with reference to the cladding region 120 as a reference area.

In the refractive index profile of FIG. 3B, the first core 111 with an outside diameter of a1 (4.3 μm) has a step index profile whose relative refractive index difference $\Delta n_1$ with respect to the cladding region 120 is −0.58%. On the other hand, the second core 112 with an outside diameter of b1 (7.1 μm) has a step index profile whose relative refractive index difference $\Delta n_2$ with respect to the cladding region 120 is 1.09%, while substantially yielding a thickness of (b1−a1)/2. Here, as fluorine is introduced into $SiO_2$ by MCVD method, the first core 111 is set to an average refractive index $n_1$ which is lower than the average refractive index $n_c$ of the cladding region 120; whereas, as $GeO_2$ is added into $SiO_2$ by MCVD method, the second core 112 is set to an average refractive index $n_2$ which is higher than the average refractive index $n_c$ of the cladding region 120.

Figure 3C:
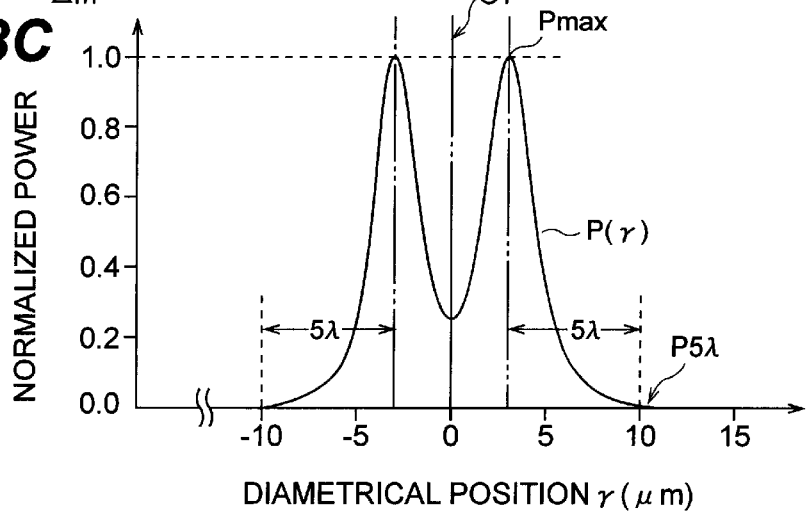
FIG. 3C is a view showing a power distribution of light propagating through the dispersion-shifted optical fiber of the first embodiment shown in FIG. 3A.

FIG. 3C shows the power distribution P(r) of signal light propagating through the dispersion-shifted optical fiber 100 of the first embodiment. In this graph, optical power attains the maximum value $P_{max}$ at a position (hereinafter referred to as a peak position) shifted from the center position (r=0) of the core region 110, and drastically decreases toward the outer periphery. In particular, the optical power P(5λ) at a position (hereinafter referred to as evaluation reference position) radially separated from the peak position by a distance (5λ) which is five times the wavelength λ becomes 1/100 or less of the maximum optical power $P_{max}$. Also, the effective area $A_{eff}$ becomes 70 μm² or more.

Figure 1A:
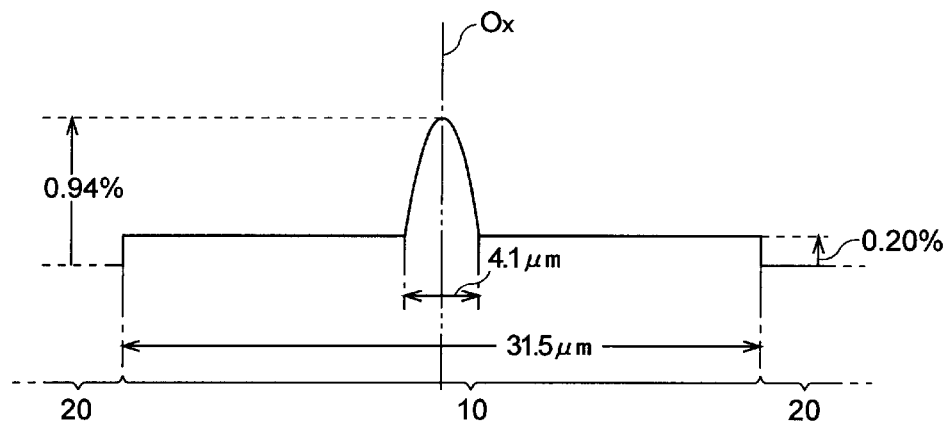
Figure 1B:
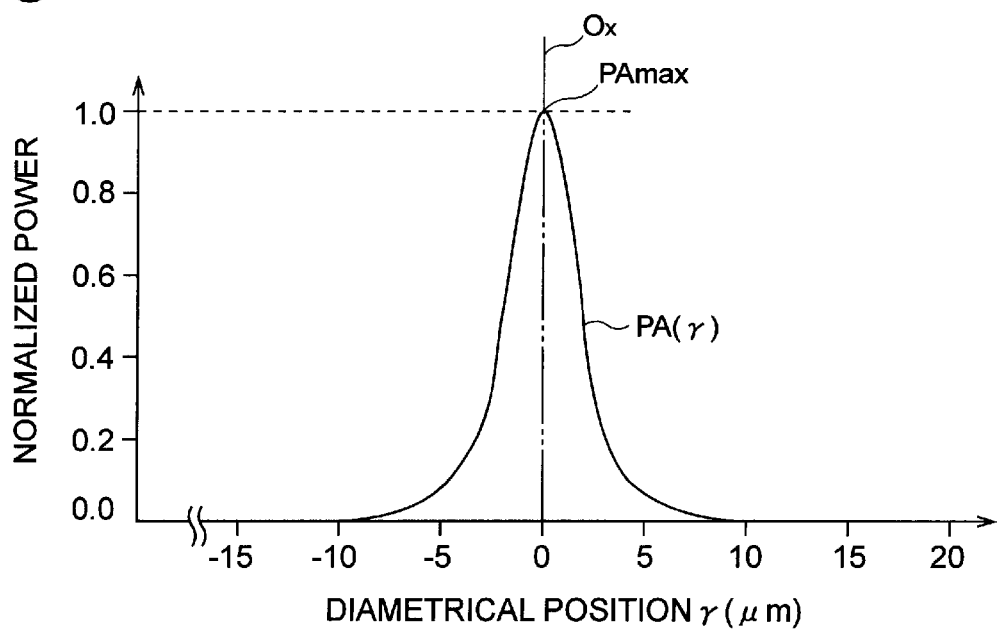
FIG. 1B is a view showing a power distribution of light propagating through the conventional dispersion-shifted optical fiber.
Figure 4:
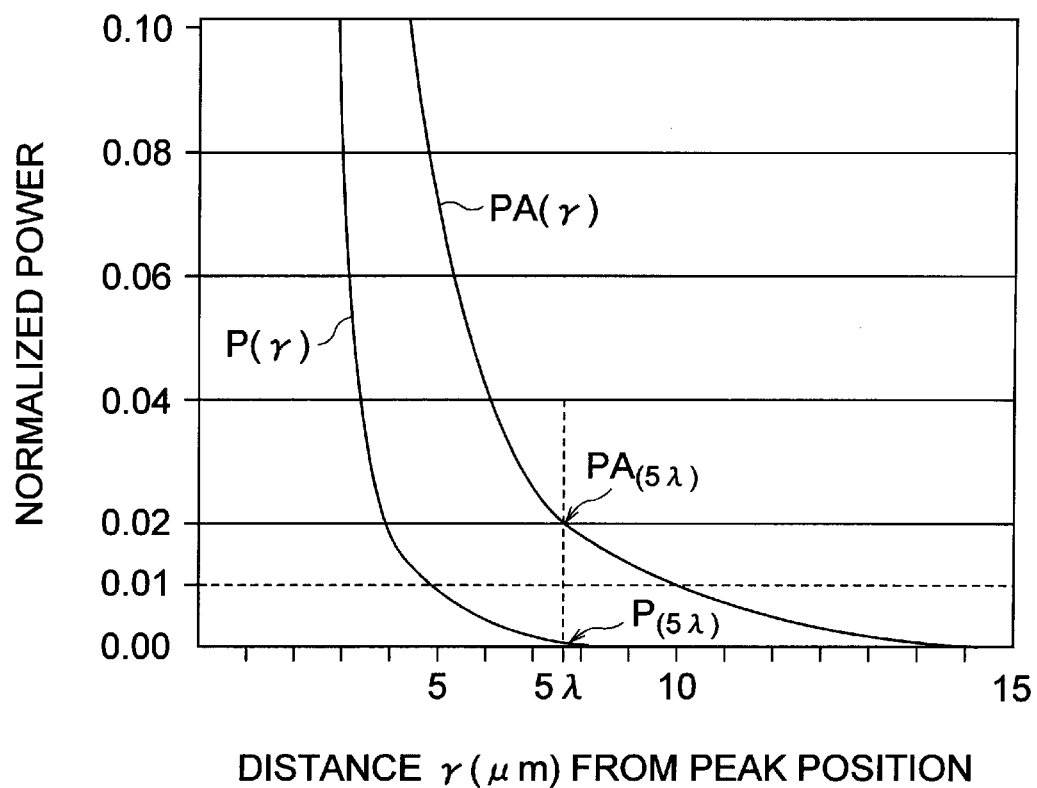
FIG. 4 is a view showing skirt portions in power distribution of light propagating through the dispersion-shifted optical fiber of the first embodiment shown in FIGS. 3A to 3C and in the conventional dispersion-shifted optical fiber as compared with each other.

FIG. 4 is a view magnifying the respective skirt portions of the power distribution PA(r) of light propagating through the conventional dispersion-shifted optical fiber shown in FIGS. 1A and 1B and the power distribution P(r) of light propagating through the dispersion-shifted optical fiber 100 according to the first embodiment. As can be seen from FIG. 4, the optical power P(5λ) at the evaluation reference position radially separated from the peak position by 5λ in the dispersion-shifted optical fiber 100 according to the first embodiment is $P(5\lambda) \leq P_{max}/100$, whereas the optical power PA (5λ) at the evaluation reference position (position radially separated by 5λ from the core center yielding its maximum optical power $PA_{max}$) in the conventional dispersion-shifted optical fiber 100 is much larger than 1/100 of the maximum optical power $PA_{max}$.

The inventors evaluated the optical loss caused by macrobending in each of the conventional dispersion-shifted optical fiber 100 and the dispersion-shifted optical fiber according to the first embodiment. This evaluation was carried out by measuring the loss of light at 1550 nm before and after each of these optical fibers was wound around a cylindrical reel having a diameter of 20 mm. As a result, the dispersion-shifted optical fiber 100 according to the first embodiment yielded an increase of 0.1 dB/m in optical loss between before and after the winding, whereas the conventional dispersion-shifted optical fiber yielded an increase of 2.0 dB/m in optical loss between before and after the winding. Thus, the superiority of the dispersion-shifted optical fiber 100 according to the first embodiment was confirmed.

Further, the inventors evaluated the optical loss caused by microbending in each of the conventional dispersion-shifted optical fiber 100 and the dispersion-shifted optical fiber according to the first embodiment. This evaluation was carried out by measuring the loss of light at 1550 nm before and after each of these optical fibers was wound around a cylindrical reel having a diameter of 280 mm whose surface carried sandpaper attached thereto. As a result, the dispersion-shifted optical fiber 100 according to the first embodiment yielded an increase of 0.2 dB/km in optical loss, whereas the conventional dispersion-shifted optical fiber yielded an increase of 11.2 dB/km in optical loss. It has also proved the superiority of the dispersion-shifted optical fiber 100 according to the first embodiment.

As explained in the foregoing, when the refractive index profile is designed such that optical power attains its maximum $P_{max}$ at a position (peak position) shifted from the center position of the core region and that the optical power P(5λ) at the evaluation reference position radially separated from the peak position by a distance (5λ) which is five times the signal light wavelength λ becomes 1/100 or less of the $P_{max}$, the effective area $A_{eff}$ can be increased without extremely broadening the enveloe of optical power distribution P(r). As a result, light can well be confined, thereby the optical loss caused by macrobending or microbending can be reduced.

Further, when the effective area $A_{eff}$ is set to 70 μm² or more, nonlinear phenomena such as self-phase modulation, cross-phase modulation, four-wave mixing, and the like can be reduced, whereby distortion of signal light can be restrained from occurring.

Figure 2:
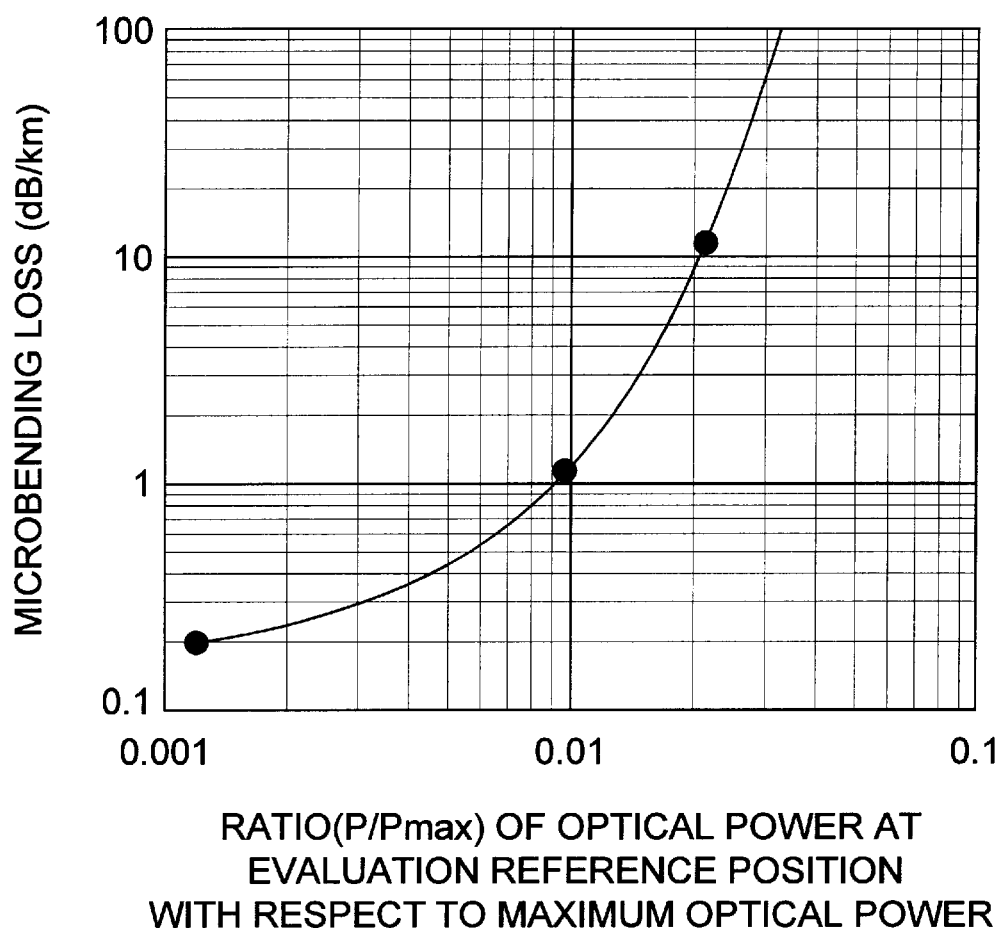
FIG. 2 is a graph showing a relationship between a microbending loss and a ratio $(P/P_{max})$ of an optical power P at an evalution reference position with respect to a maximum optical power $P_{max}$.

FIG. 2 is a graph showing, as a relationship between a bending loss and an optical power, a relationship between a microbending loss (dB/km) and a ratio ($P/P_{max}$) of an optical power at an evaluation position with respect to a maximum optical power $P_{max}$.

In order to suppress the microbending loss caused by cable-fabrication to a sufficient level in practice, the microbending loss should be suppressed to 1 dB/km or less. Thus, it is necessary that the ratio ($P/P_{max}$) of an optical power at the evaluation reference position with respect to a maximum optical power $P_{max}$ becomes 1/100 or less. Accordingly, the dispersion-shifted optical fiber according to the first embodiment realizes both expansion of the effective area and suppression of bending loss.

Second Embodiment

Figure 5A:
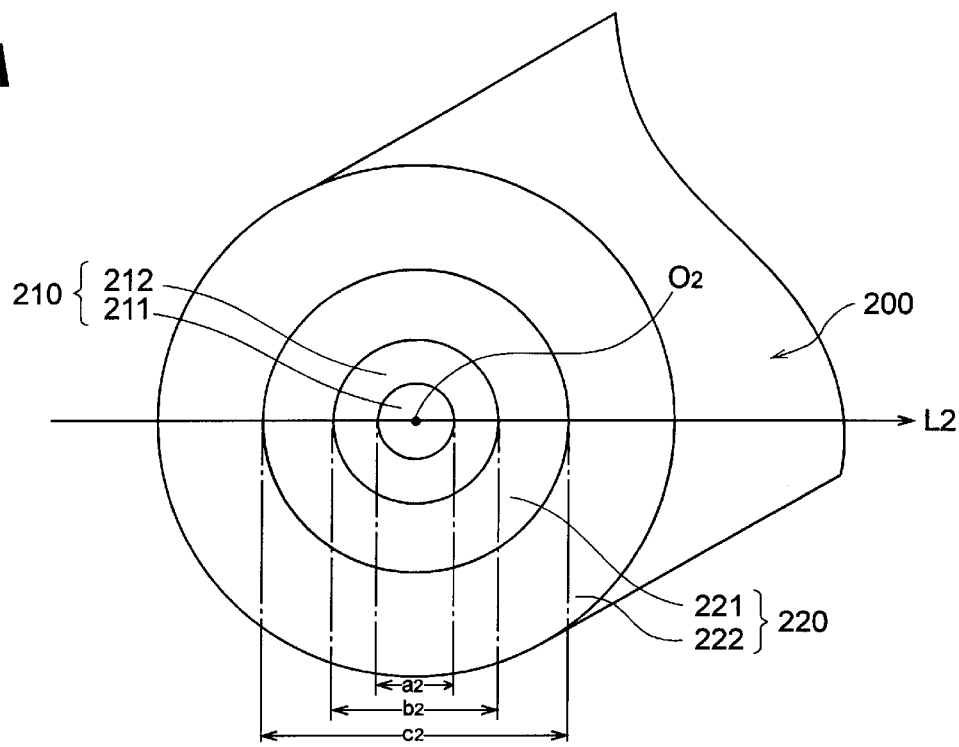
FIG. 5A is a view showing a cross-sectional structure of a second embodiment of dispersion-shifted optical fiber according to the present invention.

FIG. 5A is a view showing a cross-sectional structure of the second embodiment of dispersion-shifted optical fiber according to the present invention.

As with the above-mentioned first embodiment, the dispersion-shifted optical fiber according to the second embodiment is a single-mode optical fiber which guides signal light in a 1.55-μm wavelength band whose center wavelength λ falls within the range of about 1500 to 1600 nm. Also, as shown in FIG. 5A, this dispersion-shifted optical fiber 200 comprises a core region 210 and a cladding region 220 provided on the outer periphery of the core region 210. The core region 210 is constituted by a first core 211 having an outside diameter a2 (5.8 μm) and a second core 212 provided on the outer periphery of the first core 211 and having an outside diameter b2 (9.2 μm) (thus forming a ring-shaped core structure). On the other hand, the cladding region 220 comprises a first cladding 221 provided on the outer periphery of the second core 212 and having an outside diameter c2 (13.6 μm), and a second cladding 222 provided on the outer periphery of the first cladding 221 (thus forming a depressed cladding structure).

Figure 5B:
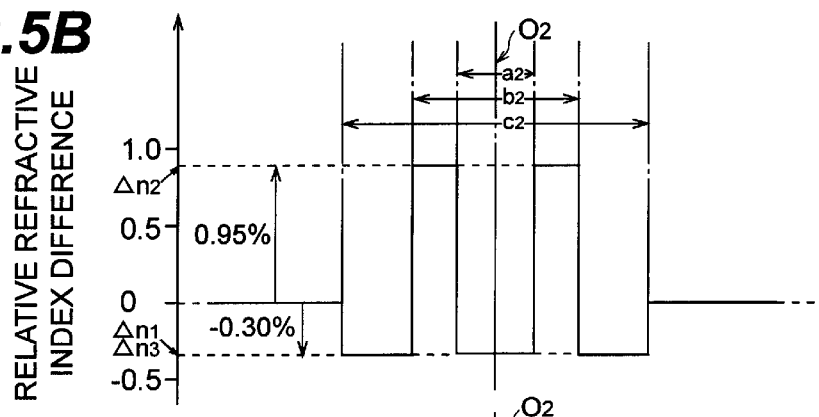
FIG. 5B is a refractive index profile of the dispersion-shifted optical fiber of the second embodiment shown in FIG. 5A.

FIG. 5B is a refractive index profile of the dispersion-shifted optical fiber 200 of the second embodiment shown in FIG. 5A, which is represented by the relative refractive index difference of each part along the line L2 passing through the center $O_2$ of the dispersion-shifted optical fiber 200. Here, the relative refractive index difference is given by the above-mentioned expression (2), with reference to the second cladding 222 as a reference area.

In the refractive index profile of FIG. 5B, the first core 211 with an outside diameter of a2 (5.8 μm) has a relative refractive index difference $\Delta n_1$ of −0.30% with respect to the second cladding 222, whereas the second core 212 with an outside diameter of b2 (9.2 μm) has a relative refractive index difference $\Delta n_2$ of 0.95% with respect to the second cladding 222. The first cladding 221 with an outside diameter of c2 (13.6 μm) has a relative refractive index difference $\Delta n_3$ of −0.30% with respect to the second cladding 222. Here, as fluorine is introduced into $SiO_2$ by MCVD method, the respective refractive indexes $n_1$ and $n_3$ of the first core 211 and first cladding 221 are set to a value lower than the refractive index $n_c$ of the second cladding 222; whereas, as $GeO_2$ is added into $SiO_2$ by MCVD method, the refractive index $n_2$ of the second core 212 is set to a value which is higher than the refractive index $n_c$ of the second cladding 222.

Figure 5C:
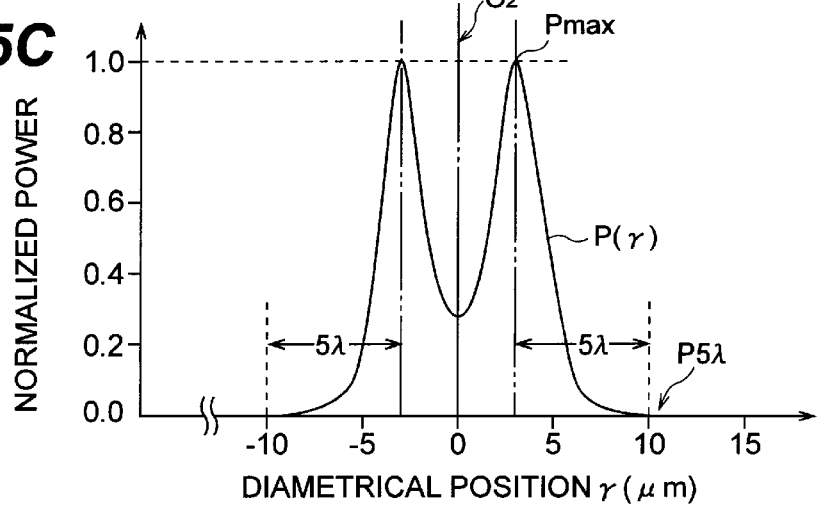
FIG. 5C is a view showing a power distribution of light propagating through the dispersion-shifted optical fiber of the second embodiment shown in FIG. 5A.

FIG. 5C shows the power distribution P(r) of signal light propagating through the dispersion-shifted optical fiber 200 of the second embodiment. In this graph, optical power attains the maximum value $P_{max}$ at a peak position shifted from the center position (r=0) of the core region 210, and drastically decreases toward the outer periphery. In particular, the optical power P(5λ) at an evaluation reference position radially separated from the peak position by a distance (5λ) which is five times the wavelength λ becomes 1/100 or less of the maximum optical power $P_{max}$. Also, the effective area $A_{eff}$ becomes 70 μm² or more.

As explained in the foregoing, when the refractive index profile is designed such that optical power attains its maximum $P_{max}$ at a position (peak position) shifted from the center position of the core region and that the optical power P(5λ) at the evaluation reference position radially separated from the peak position by a distance (5λ) which is five times the signal light wavelength λ becomes 1/100 or less of the $P_{max}$, the effective area $A_{eff}$ can be increased without extremely broadening the envelope of optical power distribution P(r). As a result, light can well be confined, thereby the optical loss caused by macrobending or microbending can be reduced.

Further, when the effective area $A_{eff}$ is set to 70 μm² or more, nonlinear phenomena such as self-phase modulation, cross-phase modulation, four-wave mixing, and the like can be reduced, thereby distortion of signal light can be restrained from occurring.

Third Embodiment

Figure 6A:
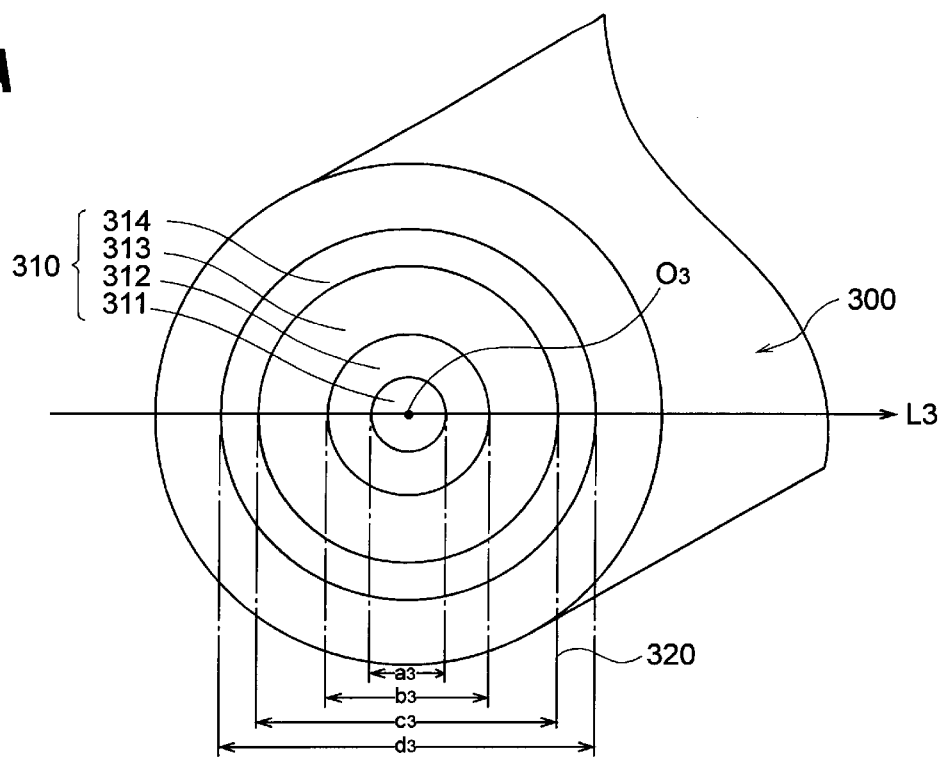
FIG. 6A is a view showing a cross-sectional structure of a third embodiment of dispersion-shifted optical fiber according to the present invention.

FIG. 6A is a view showing a cross-sectional structure of the third embodiment of dispersion-shifted optical fiber according to the present invention.

As with the above-mentioned first and second embodiments, the dispersion-shifted optical fiber according to the third embodiment is a single-mode optical fiber which guides signal light in a 1.55-μm wavelength band whose center wavelength λ falls within the range of about 1500 to 1600 nm. Also, as shown in FIG. 6A, this dispersion-shifted optical fiber 300 comprises a core region 310 and a cladding region 320 provided on the outer periphery of the core region 310. The core region 310 is constituted by a first core 311 having an outside diameter a3 (4.4 μm); a second core 312 provided on the outer periphery of the first core 311 and having an outside diameter b3 (8.4 μm); a third core 313 provided on the outer periphery of the second core 312 and having an outside diameter c3 (15.4 μm); and a fourth core 314 provided on the outer periphery of the third core 313 and having an outside diameter d3 (19.4 μm) (thus forming a multilayer core structure).

Figure 6B:
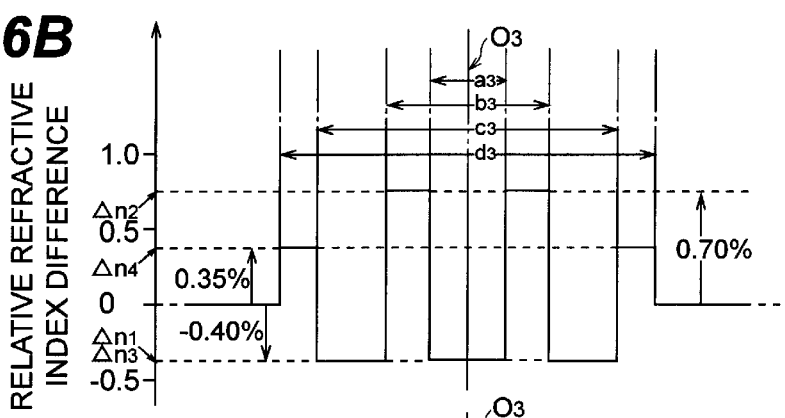
FIG. 6B is a refractive index profile of the dispersion-shifted optical fiber of the third embodiment shown in FIG. 6A.

FIG. 6B is a refractive index profile of the dispersion-shifted optical fiber 300 of the third embodiment shown in FIG. 6A, which is represented by the relative refractive index difference of each part along the line L3 passing through the center $O_3$ of the dispersion-shifted optical fiber 300. Here, the relative refractive index difference is given by the above-mentioned expression (2), with reference to the cladding region 320 as a reference area.

In the refractive index profile of FIG. 6B, with respect to the cladding region 320, the first core 311 with an outside diameter of a3 (4.4 μm) has a relative refractive index difference $\Delta n_1$ of −0.40%, the second core 312 with an outside diameter of b3 (8.4 μm) has a relative refractive index difference $\Delta n_2$ of 0.7%, the third core 313 with an outside diameter of c3 (15.4 μm) has a relative refractive index difference $\Delta n_3$ of −0.40%, and the fourth core 314 with an outside diameter of d3 (19.4 μm) has a relative refractive index difference $\Delta n_4$ of 0.35%. Here, as fluorine is introduced into $SiO_2$ by MCVD method, the respective refractive indexes $n_1$ and $n_3$ of the first core 311 and third core 313 are set to a value lower than the refractive index $n_c$ of the cladding region 320; whereas, as $GeO_2$ is added into $SiO_2$ by MCVD method, the respective refractive indexes $n_2$ and $n_4$ of the second core 312 and fourth core 314 are set to values which are higher than the refractive index $n_c$ of the cladding region 320.

Figure 6C:
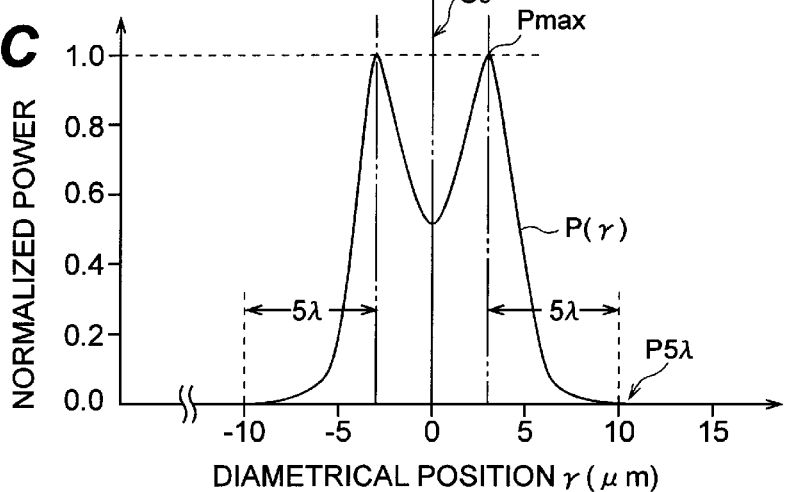
FIG. 6C is a view showing a power distribution of light propagating through the dispersion-shifted optical fiber of the third embodiment shown in FIG. 6A.

FIG. 6C shows the power distribution P(r) of signal light propagating through the dispersion-shifted optical fiber 300 of the third embodiment. In this graph, optical power attains the maximum value $P_{max}$ at a peak position shifted from the center position (r=0) of the core region 310, and drastically decreases toward the outer periphery. In particular, the optical power P(5λ) at an evaluation reference position radially separated from the peak position by a distance (5λ) which is five times the wavelength λ becomes ¹/₁₀₀ or less of the maximum optical power $P_{max}$. Also, the effective area $A_{eff}$ becomes 70 μm² or more.

As explained in the foregoing, when the refractive index profile is designed such that optical power attains its maximum $P_{max}$ at a position (peak position) shifted from the center position of the core region and that the optical power P(5λ) at the evaluation reference position radially separated from the peak position by a distance (5λ) which is five times the signal light wavelength λ becomes ¹/₁₀₀ or less of the $P_{max}$, the effective area $A_{eff}$ can be increased without extremely broadening the envelope of optical power distribution P(r). As a result, light can well be confined, thereby the optical loss caused by macrobending or microbending can be reduced.

Further, when the effective area $A_{eff}$ is set to 70 μm² or more, nonlinear phenomena such as self-phase modulation, cross-phase modulation, four-wave mixing, and the like can be reduced, whereby distortion of signal light can be restrained from occurring.

The dispersion-shifted optical fiber according to the present invention should not be restricted to those having refractive index profiles shown in the above-mentioned first to third embodiments, but can also be realized by a greater number of cores while adjusting the relative refractive index difference of each core.

In the dispersion-shifted optical fiber according to the present invention, as explained in the foregoing, since the refractive index profile is designed such that the peak position where the optical power in the fundamental mode is maximized is shifted from the center of the core region and that optical power at the evaluation reference position radially separated from the peak position by a distance which is five times the signal light wavelength becomes ¹/₁₀₀ or less of the maximum optical power at the peak position, the effective area $A_{eff}$ can sufficiently be increased without broadening the envelope of optical power distribution.

As a result, light can well be confined, thereby the optical loss caused by macrobending or microbending can be reduced. Further, since the effective area $A_{eff}$ is 70 μm² or more, nonlinear phenomena such as self-phase modulation, cross-phase modulation, four-wave mixing, and the like can be reduced, whereby distortion of signal light can be restrained from occurring. Thus, since it becomes possible to reduce optical loss and suppress nonlinear phenomena, a dispersion-shifted optical fiber suitable for further long-haul transmission and wavelength-division multiplexing transmission can be provided.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A dispersion-shifted optical fiber comprising a core region extending along a predetermined axis, and a cladding region provided on the outer periphery of said core region, said dispersion-shifted optical fiber having an effective area of 70 μm² or more with respect to light whose center wavelength falls within the range of 1500 to 1600 nm, and a refractive index profile designed such that a peak position where optical power of said light in a fundamental mode is maximized is radially shifted from a center of said core region by a predetermined distance and that optical power at a position radially separated from said peak position by a distance which is five times the center wavelength of said light becomes ¹/₁₀₀ or less of the optical power at said peak position.

2. A dispersion-shifted optical fiber according to claim 1, wherein said core region comprises a first core having a predetermined refractive index; and a second core provided on the outer periphery of said first core and having a refractive index higher than that of said first core.

3. A dispersion-shifted optical fiber according to claim 2, wherein said cladding region comprises a first cladding provided on the outer periphery of said second core and having a refractive index lower than that of said second core; and a second cladding provided on the outer periphery of said first cladding and having a refractive index higher than that of said first cladding.

4. A dispersion-shifted optical fiber according to claim 1, wherein said core region comprises a first core having a predetermined refractive index; a second core provided on the outer periphery of said first core and having a refractive index higher than that of said first core; a third core provided on the outer periphery of said second core and having a refractive index lower than that of said second core; and a fourth core provided on the outer periphery of said third core and having a refractive index higher than that of said third core.

5. A dispersion-shifted optical fiber according to claim 4, wherein said cladding region comprises a first cladding provided on the outer periphery of said fourth core and having a refractive index lower than that of said fourth core; and a second cladding provided on the outer periphery of said first cladding and having a refractive index higher than that of said first cladding.

6. A dispersion-shifted optical fiber having, as a characteristic for light whose center wavelength falls within the range of 1500 to 1600 nm, an effective area of 70 μm² or more, wherein a peak position where optical power of said light in a fundamental mode is maximized is radially shifted from a center of a core region by a predetermined distance, and wherein optical power at a position radially separated from said peak position by a distance which is five times the center wavelength of said light becomes ¹/₁₀₀ or less of the optical power at said peak position.

* * * * *

UNITED STATES PATENT AND TRADEMARK OFFICE
CERTIFICATE OF CORRECTION

PATENT NO.    : 6,229,946 B1
DATED         : May 8, 2001
INVENTOR(S)   : Sasaoka et al.

It is certified that error appears in the above-identified patent and that said Letters Patent is hereby corrected as shown below:

<u>Title page,</u>
Item [73], correct the name of the Assignee from "Sumitomo Chemical Company, Osaka-shi, Japan" to -- Sumitomo Electric Industries, Ltd., Osaka-shi, Japan --

Signed and Sealed this

Eleventh Day of June, 2002

Attest:

JAMES E. ROGAN
Attesting Officer          Director of the United States Patent and Trademark Office